Patented Oct. 4, 1927.

1,644,439

UNITED STATES PATENT OFFICE.

WILHELM MÜLLER, OF BITTERFELD, GERMANY, ASSIGNOR TO THE FIRM I. G. FARBEN-INDUSTRIE AKTIENGESELLSCHAFT, OF FRANKFORT-ON-THE-MAIN, GERMANY.

METHOD AND AGENT FOR DRYING GASES.

No Drawing. Application filed March 30, 1927, Serial No. 179,718, and in Germany June 7, 1926.

This invention relates to the method of drying air and other gases by means of phosphorus pentoxid. The well-known method of drying gases by means of solid phosphorus pentoxid is objectionable from an industrial point of view, owing to the fact that this substance melts away at its surface when absorbing water, whereby the adjacent layers are coated with a hard crust, and a considerable part of the phosphorus pentoxid becomes inaccessible to moist air and therefore inoperative.

Now I have found that gases can be dried with utmost facility by employing phosphorus pentoxid, not in solid form but in form of a solution in phosphoric acid. Air, for instance, is dried by such a solution already after short contact therewith. Whereas, for instance, an aqueous phosphoric acid containing 80% of phosphoric acid absorbs only 67% of the water content within a certain time of contact, under the same conditions the drying effect of undiluted phosphoric acid amounts to 90%, and of a solution of 12% of phosphorus pentoxid in undiluted phosphoric acid to 100%. The vapor tension of the water in these phosphorus pentoxid solutions is so extraordinarily small and to such a degree independent of the temperature that it is possible to work at elevated temperatures, for instance, at 80° C.; therefore the method may be employed if the gases under treatment are hot.

My improved method has special advantages, for instance, in connection with the manufacture of high-grade phosphoric acid by combustion of phosphorus or gas mixtures containing phosphorus, by means of dry air, as part of the phosphorus pentoxid obtained by this process may be employed itself as drying agent in the above indicated form. Preferably the phosphoric acid containing phosphorus pentoxid is used for drying purposes until, by absorbing water from the air to be dried, a 100% phosphoric acid is formed.

I claim:—

1. The improved method of drying air or other gases which comprises treating the gases with a solution of phosphorus pentoxid in anhydrous phosphoric acid.

2. An agent for drying air or other gases, consisting of anhydrous phosphoric acid in which phosphorus pentoxid is dissolved.

In testimony whereof I affix my signature.

WILHELM MÜLLER.